US011469050B2

United States Patent
Oh et al.

(10) Patent No.: US 11,469,050 B2
(45) Date of Patent: Oct. 11, 2022

(54) MULTILAYER CERAMIC ELECTRONIC COMPONENT AND MANUFACTURING METHOD THEREOF

(71) Applicant: SAMHWA CAPACITOR CO., LTD., Yongin-si (KR)

(72) Inventors: Young Joo Oh, Seoul (KR); Jung Rag Yoon, Yongin-si (KR)

(73) Assignee: SAMHWA CAPACITOR CO., LTD., Gyeonggi-Do (KR)

( * ) Notice: Subject to any disclaimer, the term of this patent is extended or adjusted under 35 U.S.C. 154(b) by 130 days.

(21) Appl. No.: 17/112,128

(22) Filed: Dec. 4, 2020

(65) Prior Publication Data

US 2021/0319953 A1    Oct. 14, 2021

(30) Foreign Application Priority Data

Apr. 8, 2020    (KR) .................. 10-2020-0042475

(51) Int. Cl.
*H01G 4/30*   (2006.01)
*H01G 4/008*   (2006.01)
*H01G 4/012*   (2006.01)
*H01G 4/12*   (2006.01)

(52) U.S. Cl.
CPC .............. *H01G 4/30* (2013.01); *H01G 4/008* (2013.01); *H01G 4/012* (2013.01); *H01G 4/1218* (2013.01)

(58) Field of Classification Search
CPC ...... H01G 4/008; H01G 4/012; H01G 4/1218; H01G 4/30
See application file for complete search history.

(56) References Cited

U.S. PATENT DOCUMENTS

| | | | |
|---|---|---|---|
| 5,335,139 A | 8/1994 | Nomura et al. | |
| 9,384,898 B2* | 7/2016 | Kang | H01G 4/232 |
| 9,758,695 B2* | 9/2017 | Hong | H01G 4/232 |
| 10,726,997 B2* | 7/2020 | Kim | H01G 4/30 |

* cited by examiner

*Primary Examiner* — Nathan Milakovich
(74) *Attorney, Agent, or Firm* — Cantor Colburn LLP (57) ABSTRACT

Provided is a multilayer ceramic electronic component and a manufacturing method thereof, the component comprising: an element unit including a ceramic body, and a plurality of first internal electrodes and second internal electrodes alternately positioned inside the ceramic body to be spaced apart from each other; an external electrode unit including a first external electrode electrically communicating with the first internal electrodes and a second external electrode electrically communicating with the second internal electrodes, which are positioned to surround both sides of the element unit and to be spaced apart from each other; a silane coating layer uniformly formed on an outer surface of the element unit to expose part of an outer surface of the external electrode unit; and a plating layer formed on the exposed area of the external electrode unit.

16 Claims, 3 Drawing Sheets

MULTILAYER CERAMIC ELECTRONIC COMPONENT AND MANUFACTURING METHOD THEREOF

This invention was made with government support as follows: Government Department: Ministry of Trade, Industry and Energy; Research Management Specialized Agency: Korea Evaluation Institute of Industrial Technology; Research Project: Industrial Core Technology Development Project; Research Task: Development and Application of Ultra-Small High-Capacity MLCC for Automotive Electronics; Managing department; SAMWHA CAPACITOR CO., LTD; and Research Period: Sep. 1, 2019 to Feb. 28, 2021.

BACKGROUND OF THE INVENTION

1. Technical Field

The present invention relates to a multilayer ceramic electronic component and a manufacturing method thereof, and more specifically, to a multilayer ceramic electronic component and a manufacturing method thereof, which can coat a ceramic surface to improve mechanical strength of the component and fracture characteristics by thermal shock, minimize surface discharge and electric field concentration to be applied to a high voltage, and minimize influence of humidity to extend the lifespan.

2. Description of the Related Art

A multilayer ceramic electronic component has a configuration including a plurality of stacked ceramic layers and electrodes arranged between the ceramic layers, and may include a multilayer ceramic capacitor, a multilayer chip inductor, a multilayer power inductor, a multilayer chip bead, and the like. The multilayer ceramic electronic components are used in electronic devices such as digital AV devices, computers, smart pads, communication terminals and the like for various purposes such as are DC-blocking, by-passing, coupling and the like.

Generally, a multilayer ceramic capacitor (MLCC) is manufactured in the shape of a rectangular parallelepiped in most cases by stacking and laminating a plurality of dielectric sheets having an electrode pattern formed thereon, polishing the top and bottom surfaces to remove steps generated by the electrode pattern, forming an external electrode, and forming a plating layer thereon.

Recently, as electronic products are miniaturized and become multifunctional, electronic components of a chip shape also tend to be miniaturized and highly functional, and multilayer ceramic electronic components are also required to be miniaturized while having high capacity.

Although a method of forming a dielectric sheet using a material having high permittivity or increasing the number of layers by thinning the dielectric sheet is mainly used to manufacture high-capacity multilayer ceramic electronic components, much time and money may be required to develop techniques for developing a new dielectric of high permittivity. Therefore, in most cases, a method of inducing an effect of connecting a plurality of capacitors in parallel, which is accomplished by stacking green sheets (dielectric sheets) of a ceramic material having an electrode pattern printed thereon in multiple layers, is used. That is, when the number of stacks of thin-filmed green sheets increases, an effect of connecting more capacitors in parallel is obtained, and a miniaturized multilayer ceramic electronic component with high capacity can be implemented.

Therefore, for the multilayer ceramic electronic components gradually miniaturized, it is required to develop a technique for further improving mechanical strength against thermal shock and external shock applied to the ceramic layers and internal electrodes stacked therein. However, due to the ceramic layers thinned for miniaturization, the lifespan of the multilayer ceramic electronic components may be reduced by the influence of external moisture, and it is further required to develop techniques for minimizing the surface discharge problem and electric field concentration in the multilayer ceramic electronic components of high-capacity.

SUMMARY OF THE INVENTION

Therefore, the present invention has been made in view of the above problems, and it is an object of the present invention to provide a multilayer ceramic electronic component and a manufacturing method thereof, which can improve the lifespan and reliability by minimizing the effect of humidity by strengthening the ceramic surface through uniform coating.

In addition, another object of the present invention is to provide a multilayer ceramic electronic component and a manufacturing method thereof, which can improve mechanical strength of the component and improve fracture characteristics by thermal shock through coating the ceramic surface.

Furthermore, another object of the present invention is to provide a multilayer ceramic electronic component and a manufacturing method thereof, which can be applied to a high voltage through minimization of surface discharge and electric field concentration through a coating on the ceramic surface.

Furthermore, another object of the present invention is to provide a multilayer ceramic electronic component and a manufacturing method thereof, which can improve bending strength characteristics by providing a metal epoxy electrode layer in an external electrode.

The objects of the present invention are not limited to the objects mentioned above, and unmentioned other objects will be clearly understood by those skilled in the art from the following description.

To accomplish the above objects, according to one aspect of the present invention, there is provided a multilayer ceramic electronic component comprising: an element unit including a ceramic body, and a plurality of first internal electrodes and second internal electrodes alternately positioned inside the ceramic body to be spaced apart from each other; an external electrode unit including a first external electrode electrically communicating with the first internal electrodes and a second external electrode electrically communicating with the second internal electrodes, which are positioned to surround both sides of the element unit and to be spaced apart from each other; a silane coating layer uniformly formed on the outer surface of the element unit to expose part of the outer surface of the external electrode unit; and a plating layer formed on the exposed area of the external electrode unit.

The multilayer ceramic electronic component may further comprise a polyxylene polymer film formed on the silane coating layer.

In addition, to solve the problems described above, the present invention provides a method of manufacturing a multilayer ceramic electronic component, the method comprising the steps of: forming an element unit to include a ceramic body, and a plurality of first internal electrodes and second internal electrodes alternately positioned inside the ceramic body to be spaced apart from each other; manufacturing a chip by forming an external electrode unit including a first external electrode electrically communicating with the first internal electrodes and a second external electrode electrically communicating with the second internal electrodes, which are positioned to surround both sides of the element unit and to be spaced apart from each other; forming a silane coating layer, after uniformly coating the chip using a solution containing a silane mixture, to expose part of the outer surface of the external electrode unit; and forming a plating layer on the exposed area of the external electrode unit.

The method may further include the step of forming a polyxylene polymer film on the silane coating layer to expose part of the outer surface of the external electrode unit, before the step of forming the plating layer.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION

Hereinafter, Hereinafter, preferable embodiments of the present invention will be described in detail with reference to the accompanying drawings. The embodiments introduced below are provided as examples so that the spirit of the present invention may be sufficiently conveyed to those skilled in the art. Accordingly, the present invention is not limited to the embodiments described below and may be embodied in other forms. In addition, in the drawings, the length, the thickness and the like of layers and areas may be exaggerated for convenience. Like reference symbols denote like elements throughout the specification.

Figure 1:
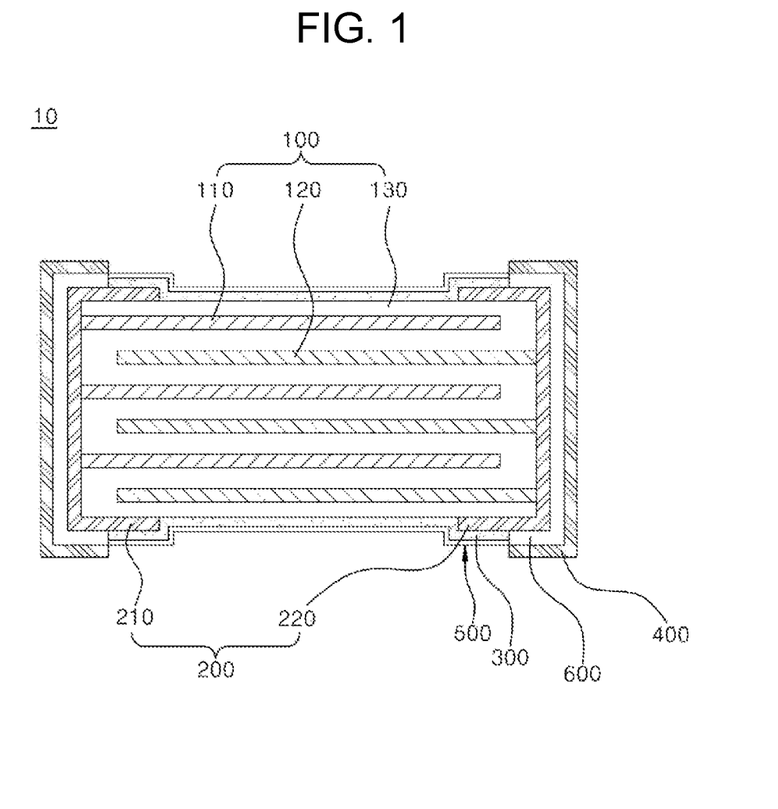
FIG. 1 is a cross-sectional view showing a multilayer ceramic electronic component according to an embodiment of the present invention.
Figure 2:
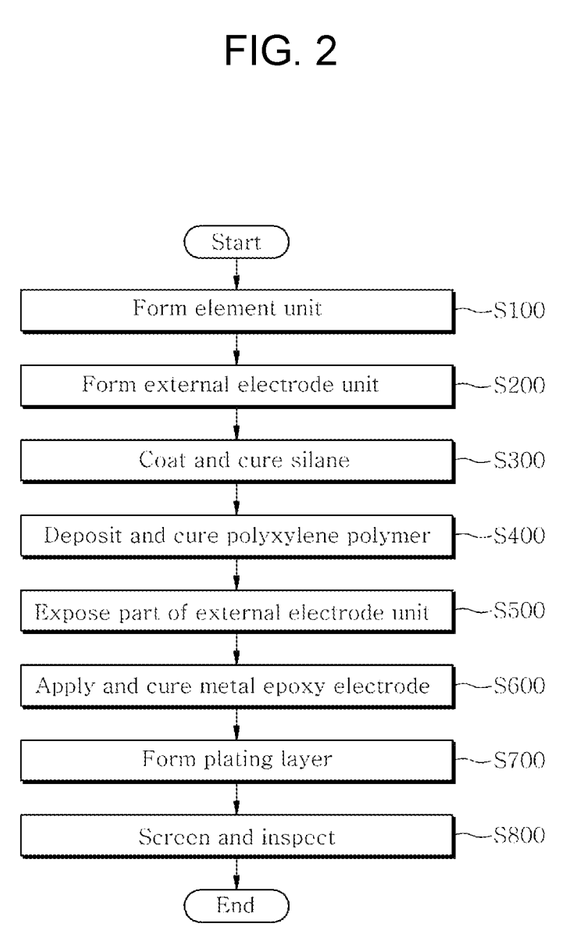
FIG. 2 is a flowchart illustrating a method of manufacturing a multilayer ceramic electronic component according to an embodiment of the present invention.
Figure 3:
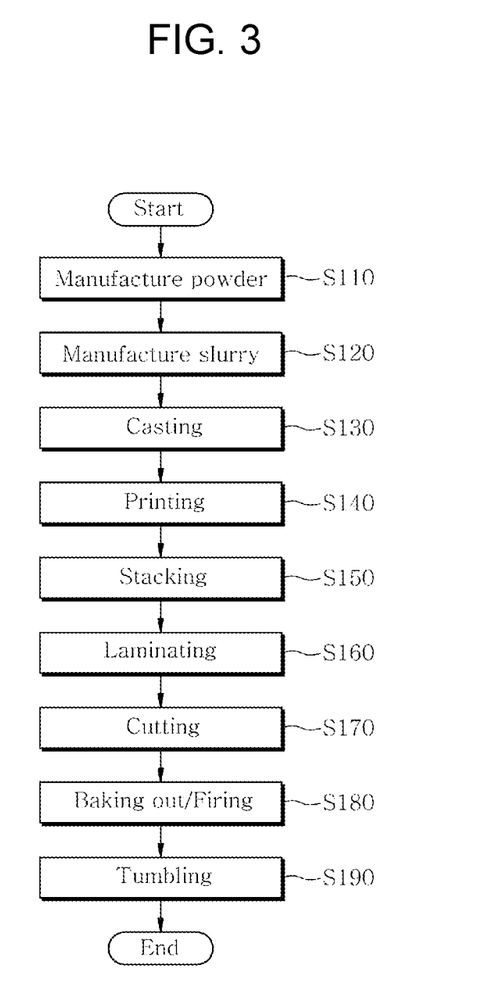
FIG. 3 is a flowchart illustrating a step of forming a general element unit.

FIG. 1 is a cross-sectional view showing a multilayer ceramic electronic component according to an embodiment of the present invention, FIG. 2 is a flowchart illustrating a method of manufacturing a multilayer ceramic electronic component according to an embodiment of the present invention, and FIG. 3 is a flowchart illustrating a step of forming a general element unit.

Referring to FIG. 1, a multilayer ceramic electronic component 10 according to an embodiment of the present invention may include an element unit 100, an external electrode unit 200, a silane coating layer 300, and a plating layer 400, and the element unit 100 and the external electrode unit 200 may be formed as a chip.

The element unit 100 may include a ceramic body 130, and a plurality of first internal electrodes 110 and second internal electrodes 120 alternately positioned inside the ceramic body 130 to be spaced apart from each other. The element unit 100 may be implemented to include the ceramic body 130 and the plurality of first internal electrodes 110 and second internal electrodes 120 by stacking and laminating a plurality of thin-film dielectric sheets on which an electrode is printed.

The ceramic body 130 may be formed to include a dielectric of $BaTiO_3$ or $(BaCa)TiO_3$, and one or more selected from a group including $MnO_2$, $MgO$, $Cr_2O_3$, $Y_2O_3$, $Dy_2O_3$, $Yb_2O_3$, $V_2O_5$, $SiO_2$, and the like may be added.

The first internal electrodes 110 and the second internal electrodes 120 may be formed of a material selected among Ni, Ag, and Ag—Pd alloy, alternately positioned to be spaced apart from each other inside the ceramic body 130 while having different polarities, and positioned on one side and the other side of the ceramic body 130 to expose the end portions thereof, respectively. That is, the first internal electrodes 110 and the second internal electrodes 120 may be electrically insulated by the ceramic placed therebetween, and may electrically communicate with the external electrode unit 200 through the exposed end portions.

The external electrode unit 200 may include a first external electrode 210 electrically communicating with the first internal electrodes 110 and a second external electrode 220 electrically communicating with the second internal electrodes 120, which are positioned to surround both sides of the element unit 100 and to be spaced apart from each other. That is, the external electrode unit 200 may be electrically connected to the first internal electrodes 110 and the second internal electrodes 120 exposed on both sides of the element unit 100 to supply electricity of different polarities. For example, the external electrode unit 200 may be formed of a metal such as Cu, Ag or an Ag—Pd alloy.

The silane coating layer 300 may be uniformly formed on the outer surface of the element unit 100 and positioned to expose part of the outer surface of the external electrode unit 200. That is, it may be uniformly formed on the outer surface of the chip and positioned to expose part of the external electrode unit 200. In addition, the plating layer 400 may be positioned on the exposed area of the external electrode unit 200. The plating layer 400 may be provided by plating Ni or Sn, and the bonding property of soldering may be improved and corrosion of the external electrode unit 200 may be prevented thereafter by the plating layer 400 in the process of soldering on the circuit board of the multilayer ceramic electronic component 10.

In addition, the surface of the ceramic body 130 may be strengthened by uniformly coating of the silane coating layer 300, and this may improve moisture resistance of the element unit 100 and minimize the effect of humidity, and thus lifespan and reliability of the multilayer ceramic electronic component 10 can be improved.

The silane coating layer 300 may contain silane having a molecular weight within a range of 200 to 1,000. For example, the silane may be one or more selected from a group including 3-Aminopropyltriethoxysilane, aminoethylaminepropyltrimethoxysilane, aminoethylaminopropyltrimethoxysilane, aminoethylaminopropylsilane, 3-aminopropyltrimethoxysilane, N-(2-Aminoethyl)-3-aminopropyltrimethoxysilane, 3-glycidoxypropyltrimethoxysilane, 3-glycidoxypropyltriethoxysilane glycidoxypropyl-methyldiethoxysilane, phenyltrimethoxysilane, phenyltriethoxysilane, mercaptopropyltrimethoxysilane, bis-triethoxysilylpropyldisulfidosilane, bis-triethoxysilylpropyltetrasulfidosilane, tetraethoxysilane, N-cyclohexyl aminomethylmethyldiethoxysilane, n-cyclohexylaminomethyltriethoxysilane, n-phenylaminomethyltrimethoxysilane, (methacryloxymethyl) methyldimethoxysilane, 3-methacryloxypropyltrimethoxysilane, (Methacryloxymethyl) methyldiethoxysilane, methacryloxymethyl-triethoxysilane, 3-methacryloxypropyltrimethoxysilane, 3-methacryloxypropyltriacetoxysilane, (isocyanatomethyl) methyldimethoxysilane, 3-isocyanatopropyltrimethoxysilane, 3-trimethoxysilylmethyl-0-methylcarbamate, n-dimethoxy-(methyl)silylmethyl-0-methylcarbamate, 3-(triethoxysilyl) propyl succinic anhydride, methyltrimethoxysilane, methyltriethoxysilane, dimethyldimethoxysilane, dimethyldiethoxysilane, trimethylethoxysilane, isooctyltrimethoxysilane, and the like.

Furthermore, the silane coating layer 300 may have a thickness of 10 to 300 nm. When the thickness is less than 10 nm, it is difficult to have the effect of moisture resistance, and when it exceeds 300 nm, it may decrease capacitance and generate stain spots or discoloration on the exterior of the ceramic body 130, and therefore, it is preferable that the silane coating layer 300 has a thickness of 10 to 300 nm.

The silane coating layer 300 may be formed of a solution in which 40 to 70 vol % of a silane mixture, 10 to 50 vol % of isopropanol group, and 10 to 20 vol % of acetyl alcohol are added. The mixing ratio of the isopropanol group and the acetyl alcohol is an important factor in configuring a desired coating thickness depending on the deposition time of the silane coating layer 300 and the pressure applied during the deposition, and a solution formed in the above ratio may be used to form the thickness of the silane coating layer 300 of 10 to 300 nm.

Furthermore, the silane mixture may be formed to contain 30 to 60 vol % of aminopropyltriethoxysilane and 40 to 70 vol % of glycidoxypropyltriethoxysilane. Although the aminopropyltriethoxysilane further improves the moisture resistance property on the surface of the silane coating layer, it is preferable to have the range described above, together with the glycidoxypropyltriethoxysilane, for the sake of adhesion to the surface of the element unit.

The multilayer ceramic electronic component 10 may further include a polyxylene polymer film 500 formed on the silane coating layer 300, and for example, the polyxylene polymer film 500 may be a parylene film. The polyxylene polymer film 500 may be formed through a deposition chamber after the step of thermal decomposition through an evaporator, and although halogen-free parylene (Parylene-N) and halogen-containing parylene (Parylene-F) may be applied, it is not limited thereto.

Therefore, as the surface of the ceramic body 130 is further strengthened through a coating including the polyxylene polymer film 500, there is an effect of improving the mechanical strength of the multilayer ceramic electronic component 10 and fracture characteristics by thermal shock, and furthermore, there is an advantage in that the multilayer ceramic electronic component 10 may be applied to a high voltage through minimization of surface discharge and electric field concentration.

The polyxylene polymer film 500 may have a thickness of 10 to 100 Å. When the thickness is less than 10 Å, it is difficult to implement the effect of improving the moisture resistance and strengthening the surface, and when it exceeds 100 Å, it will take a long time to remove the polyxylene polymer film 500 for exposure of the external electrode unit 200, or a defect in the appearance may generate, and thus it is preferable to have the range described above.

Furthermore, in the multilayer ceramic electronic component 10, a metal epoxy electrode layer 600 may be interposed between the exposed area of the external electrode unit 200 and the plating layer 400. For example, the metal epoxy electrode layer 600 may be formed of Ag epoxy, and it is not limited thereto. Therefore, as the multilayer ceramic electronic component 10 has the metal epoxy electrode layer 600 provided between the external electrode unit 200 and the plating layer 400, durability against bending cracks is improved, and therefore, there is an advantage of improving bending strength characteristics.

A method of manufacturing a multilayer ceramic electronic component according to an embodiment of the present invention will be described with reference to FIGS. 1 to 3.

In the method of manufacturing the multilayer ceramic electronic component 10 according to an embodiment of the present invention, first, an element unit 100 is formed (S100). The step of forming the element unit 100 (S100) may be a step of forming the element unit 100 to include a ceramic body 130, and a plurality of first internal electrodes 110 and second internal electrodes 120 alternately positioned inside the ceramic body 130 to be spaced apart from each other.

Referring to FIG. 3, the step of forming the element unit 100 (S100) may be a step of manufacturing dielectric powder first (Powder Fabrication) (S110). The dielectric powder may be formed to include $BaTiO_3$ or $(BaCa)TiO_3$, and one or more selected from a group including $MnO_2$, $MgO$, $Cr_2O_3$, $Y_2O_3$, $Dy_2O_3$, $Yb_2O_3$, $V_2O_5$, $SiO_2$, and the like may be added. A mixing process and heat treatment may be performed to secure physical and chemical uniformity of the mixed powder, and the dielectric powder may have a size of 80 to 300 nm through a calcination and pulverization process that can change the physical and chemical properties of the mixed powder.

Next, slurry may be manufactured (S120). Manufacturing the slurry (S120) is manufacturing uniformly dispersed slurry by giving a repulsive force to the particles inside the slurry using a dispersing device after evenly mixing a polymer binder, a dispersant, and a solvent with the dielectric powder, and therefore, formability can be secured.

In addition, casting may be performed (S130). For example, the casting may be performed by using a PET film as a casting sheet and uniformly applying the dispersed slurry on the top surface thereof. This may be a process of determining the characteristics of the ceramic sheet.

Next, an internal electrode may be printed through a printing process (S140). For example, the internal electrode may be printed on the ceramic sheet through screen printing or gravure printing using Ni, Ag or an Ag—Pd alloy.

Thereafter, the ceramic sheets on which the internal electrode is printed may be stacked (S150). That is, this is a process of peeling the sheets on which the internal electrode is printed from the PET film, and aligning and repeatedly stacking the sheets at a predetermined position according to a desired capacitance, and a plurality of first internal electrodes 110 and second internal electrodes 120 may be stacked and arranged through the process.

In addition, the stacked ceramic sheets may be laminated (S160). In the stacked ceramic sheets, dielectric particles may be rearranged through the pressure generated by the lamination, and therefore, a high packing density may be generated.

Next, the laminated ceramic sheet may be cut (S170). That is, a plurality of element units 100 configured of a plurality of first internal electrodes 110 and second internal electrodes 120 and the ceramic body 130, e.g., green chips, may be manufactured by cutting the laminated ceramic sheets in a predetermined size using a blade or a dicing saw.

In addition, a baking out/firing process may be performed on the element unit 100 (S180). By performing the baking out/firing process, the binder of the element unit 100 may be removed through heat treatment, and powder bonding inside the ceramic body 130 may be further strengthened, and therefore, it may be manufactured as a chip having a desired microstructure and electrical characteristics, enhanced insulation with the internal electrodes, and improved reliability. For example, organic substances such as the binder in the element unit 100 may be removed by treating for 30 to 50 hours in a temperature range of 200 to 300° C., and the chip may be calcined at 1150 to 1300° C. for 1 to 4 hours in a strong reducing atmosphere. In addition, as a reoxidation heat treatment, oxygen deficiency may be removed by performing heat treatment on the element unit 100, which has been fired in a strong reducing atmosphere, for 30 minutes to 2 hours at a temperature of 800 to 1000° C. in a weak reducing atmosphere, and thus, reliability of the chip can be improved.

Finally, tumbling may be performed (S190). For example, as the fragile edges are tumbled using barrel polishing after the firing process, damage by an impact due to collision of the element units 100 with each other may be minimized during a process to be performed in the future. In addition, connection to an external electrode unit 200 formed later may be prepared by exposing the plurality of first internal electrodes 110 and second internal electrodes 120 that are contracted by heat.

Next, the external electrode unit 200 may be formed in the element unit 100 manufactured in the process of S110 to S190 (S200). A chip may be manufactured by forming the external electrode units 200 to surround both sides of the element unit 100 and to be spaced apart from each other. That is, a first external electrode 210 is formed to electrically communicate with the first internal electrodes 110 exposed by the tumbling, and a second external electrode 220 is formed to electrically communicate with the second internal electrodes 120 exposed by the tumbling, and it is preferable that the shape of the external electrode unit 200 is predetermined and uniform to implement further improved electrical characteristics.

Accordingly, the external electrode unit 200 is electrically connected to the first internal electrodes 110 and the second internal electrodes 120 exposed on both sides of the element unit 100, and may supply electricity of different polarities from the outside. For example, the external electrode unit 200 may be formed of a metal such as Cu, Ag or an Ag—Pd alloy, and a baking out process may be performed at 600 to 800° C., after the electrode unit 200 is formed, to increase the mechanical strength of the external electrode unit 200 and increase adhesion to the ceramic body 130.

Next, after uniformly coating the chip with a solution containing a silane mixture, a silane coating layer may be formed and cured to expose part of the outer surface of the external electrode unit 200 (S300). As the silane coating layer 300 is uniformly formed on the ceramic body 130 and part of the external electrode unit 200, the surface of the ceramic body 130 may be strengthened, and therefore, as the moisture resistance of the element unit 100 is improved and minimizes the effect of humidity, the lifespan and reliability of the multilayer ceramic electronic component 10 may be improved.

For example, the step of forming the silane coating layer may include a step of immersing the chip in the solution containing the silane mixture in a vacuum atmosphere of 0.1 to 1 Torr for 10 to 60 minutes, and curing for 10 to 50 minutes at a temperature of 100 to 200° C. In addition, part of the outer surface of the external electrode unit 200 may be exposed by removing part of the silane coating layer by using vibration barrel polishing. The step of removing part of the silane coating layer may be performed through an etching using plasma, a laser beam having a wavelength of 266 nm or less, or tumbling using a micro-abrasive, in addition to the vibration barrel polishing.

In addition, the step of forming the silane coating layer may be a step of forming the silane coating layer to have a thickness of 10 to 300 nm. When the thickness is less than 10 nm, it is difficult to have the effect of moisture resistance, and when it exceeds 300 nm, it may decrease capacitance and generate stain spots or discoloration on the exterior of the ceramic body 130, and therefore, it is preferable that the silane coating layer 300 has a thickness of 10 to 300 nm.

The step of forming the silane coating layer may be a step of forming the silane coating layer to contain silane having a molecular weight within a range of 200 to 1000. For example, the silane may be one or more selected from a group including 3-Aminopropyltriethoxysilane, aminoethylaminepropyltrimethoxysilane, aminoethylaminopropyltrimethoxysilane, aminoethylaminopropylsilane, 3-aminopropyltrimethoxysilane, N-(2-Aminoethyl)-3-aminopropyltrimethoxysilane, 3-glycidoxypropyltrimethoxysilane, 3-glycidoxypropyltriethoxysilane glycidoxypropyl-methyldiethoxysilane, phenyltrimethoxysilane, phenyltriethoxysilane, mercaptopropyltrimethoxysilane, bis-triethoxysilylpropyldisulfidosilane, bis-triethoxysilylpropyltetrasulfidosilane, tetraethoxysilane, N-cyclohexyl aminomethylmethyldiethoxysilane, n-cyclohexylaminomethyltriethoxysilane, n-phenylaminomethyltrimethoxysilane, (methacryloxymethyl) methyldimethoxysilane, 3-methacryloxypropyltrimethoxysilane, (Methacryloxymethyl) methyldiethoxysilane, methacryloxymethyl-triethoxysilane, 3-methacryloxypropyltrimethoxysilane, 3-methacryloxypropyltriacetoxysilane, (isocyanatomethyl) methyldimethoxysilane, 3-isocyanatopropyltrimethoxysilane, 3-trimethoxysilylmethyl-0-methylcarbamate, n-dimethoxy-(methyl)silylmethyl-0-methylcarbamate, 3-(triethoxysilyl) propyl succinic anhydride, methyltrimethoxysilane, methyltriethoxysilane, dimethyldimethoxysilane, dimethyldiethoxysilane, trimethylethoxysilane, isooctyltrimethoxysilane, and the like.

The solution containing the silane mixture may be manufactured by adding 40 to 70 vol % of a silane mixture, 10 to 50 vol % of isopropanol group, and 10 to 20 vol % of acetyl alcohol. The mixing ratio of the isopropanol group and the acetyl alcohol is an important factor in configuring a desired coating thickness depending on the deposition time of the silane coating layer 300 and the pressure applied during the deposition, and a solution formed in the above ratio may be used to form the thickness of the silane coating layer 300 of 10 to 300 nm.

Furthermore, the silane mixture may contain 30 to 60 vol % of aminopropyltriethoxysilane and 40 to 70 vol % of glycidoxypropyltriethoxysilane. Although the aminopropyltriethoxysilane further improves the moisture resistance property on the surface of the silane coating layer, it is preferable to have the range described above, together with the glycidoxypropyltriethoxysilane, for the sake of adhesion to the surface of the element unit.

Next, a plating layer 400 may be formed on the exposed area of the external electrode unit 200 (S700).

Furthermore, before the step of forming the plating layer (S700), a step of forming a polyxylene polymer film 500 on the silane coating layer 300 may be included to expose part of the outer surface of the external electrode unit 200 (S400). For example, the polyxylene polymer layer 500 may be a parylene film, and although halogen-free parylene (Parylene-N) and halogen-containing parylene (Parylene-F) may be applied, it is not limited thereto.

The polyxylene polymer film 500 may be formed as a uniform film by using chemical vapor deposition (CVD) after the step of thermal decomposition through an evaporator, and it may be formed to have a thickness of 10 to 100 Å. When the thickness is less than 10 Å, it is difficult to implement the effect of improving the moisture resistance and strengthening the surface, and when it exceeds 100 Å, it will take a long time to remove the polyxylene polymer film 500 for exposure of the external electrode unit 200, or a defect in the appearance may generate, and thus it is preferable to have the range described above.

Thereafter, part of the external electrode unit 200 may be exposed by partially removing the polyxylene polymer film 500 (S500). The step of partially removing the polyxylene polymer layer 500 may be performed through an etching using plasma, a laser beam having a wavelength of 266 nm or less, or tumbling using a micro-abrasive, in addition to the vibration barrel polishing.

As the surface of the ceramic body 130 is further strengthened through a double uniform coating including the polyxylene polymer film 500 formed on the silane coating layer 300, there is an effect of improving the mechanical strength of the multilayer ceramic electronic component 10 and fracture characteristics by thermal shock, and furthermore, it can be applied to a high voltage through minimization of surface discharge and electric field concentration.

Furthermore, before the step of forming the plating layer (S700), a metal epoxy electrode layer 600 may be formed by applying and curing metal epoxy between the external electrode unit 200 of the exposed area and the plating layer 400 (S600). For example, the metal epoxy electrode layer 600 may be formed of Ag epoxy, and it is not limited thereto. In addition, after the metal epoxy is applied, it may be cured for 30 minutes in a temperature range of 120 to 300° C.

As the metal epoxy electrode layer 600 is formed between the external electrode unit 200 and the plating layer 400 through the process described above, durability against bending cracks may be improved, and thus bending strength characteristics may be improved.

Thereafter, a plating layer 400 may be formed on the metal epoxy electrode layer 600 (S700). The plating layer 400 may be formed by plating Ni or Sn, and the bonding property of soldering may be improved and corrosion of the external electrode unit 200 may be prevented thereafter by the plating layer 400 in the process of soldering on the circuit board of the multilayer ceramic electronic component 10.

Finally, screening and inspection may be performed (S800). This is a step of measuring the electrical characteristics of the multilayer ceramic electronic component 10 manufactured in the process described above, and may be referred to as a step of separating mass products by measuring characteristics such as capacity, dielectric loss, insulation resistance and the like.

Hereinafter, a method of manufacturing a multilayer ceramic electronic component according to the present invention will be described through experimental examples described below. The experimental examples described below are only examples for explaining the present invention, and it is not limited thereto.

Comparative Example 1

Slurry is manufactured by adding MnO, MgO, DyO3, V2O5, SiO2, and glass frit to BaTiO3 as a dielectric powder raw material, and it is cast as a 3 μm dielectric sheet. After printing an Ni electrode on the dielectric sheet as an internal electrode, 400 layers of the dielectric sheet are stacked and laminated. An element unit is manufactured by cutting the stacked and laminated dielectric sheet, and after the element unit is sintered at 1200° C. for 2 hours in a reducing atmosphere, reoxidation treatment is performed at 900 to 1000° C. Both ends of the internal electrode unit are exposed by tumbling the sintered element unit, and a chip is manufactured by forming an external electrode unit connected to the internal electrode unit by performing heat treatment at 600 to 800° C. after applying Cu. The size of the chip is 3216 (3.2 mm×1.6 mm×1.6 mm).

Experimental Example 1—Formation of Epoxy Electrode Layer

A chip of the same size is manufactured in a process the same as that of Comparative example 1. An Ag epoxy electrode layer is formed on the exposed external electrode unit by using Ag epoxy.

Experimental Examples 2 and 3—Deposition of Polyxylene Polymer Film

A chip of the same size is manufactured in a process the same as in that of Comparative Example 1. Then, after forming a parylene film using a polyxylene polymer film in a chemical vapor deposition method, part of the external electrode unit is exposed. The thickness of the parylene film in Experimental Examples 2 and 3 is as shown in Table 1 below.

Experimental Examples 4 and 5—Formation of Silane Coating Layer

A chip of the same size is manufactured in a process the same as that of Comparative example 1. Then, the chip is immersed in a solution containing a silane mixture in a vacuum atmosphere of 0.1 to 1 Torr for 10 to 60 minutes, cured at a temperature of 100 to 200° C., and then part of the external electrode unit is exposed by using barrel polishing. The solution containing the silane mixture is manufactured by adding 40 to 70 vol % of a silane mixture, 10 to 50 vol % of isopropanol group, and 10 to 20 vol % of acetyl alcohol, and the silane mixture contains 30 to 60 vol % of aminopropyltriethoxysilane and 40 to 70 vol % of glycidoxypropyltriethoxysilane.

Thickness of the silane coating layer used in Experimental Examples 4 and 5 is as shown in Table 1 below.

Experimental Examples 6 to 12—Formation of Double-Layer Including Silane Coating Layer and Polyxylene Polymer Film A chip of the same size is manufactured in a process the same as that of Comparative example 1. A silane coating layer is formed in a manner the same as that of Experimental Examples 4 and 5, and the thickness of the silane coating layers in Experimental Examples 6 to 12 is formed as shown in Table 1. Then, a parylene film is deposited on the silane coating layer in a manner the same as that of Experimental Examples 2 and 3, and the thickness of the parylene film in Experimental Examples 6 to 12 is formed as shown in Table 1.

Experimental Examples 13 and 14—Deposition of Polyxylene Polymer Film, and Formation of Epoxy Electrode Layer A chip of the same size is manufactured in a process the same as that of Comparative example 1. Then, a parylene film is deposited in a manner the same as that of Experimental Examples 2 and 3, and the thickness of each parylene film in Experimental Examples 13 and 14 is formed as shown in Table 1. Next, an Ag epoxy electrode layer is formed on the exposed external electrode in a manner the same as that of Experimental Example 1.

Experimental Examples 15 and 16—Formation of Silane Coating Layer, and Formation of Epoxy Electrode Layer A chip of the same size is manufactured in a process the same as that of Comparative example 1. The silane coating layer is formed in a manner the same as that of Experimental Examples 4 and 5, and the thickness of each silane coating layer in Experimental Examples 15 and 16 is formed as shown in Table 1. Next, an Ag epoxy electrode layer is formed on the exposed external electrode in a manner the same as that of Experimental Example 1.

Experimental Examples 17 to 23—Formation of Double Layer Including Silane Coating Layer and Polyxylene Polymer Film, and Formation of Epoxy Electrode Layer A chip of the same size is manufactured in a process the same as that of Comparative example 1. Then, the silane coating layer and the parylene film are sequentially formed in a manner the same as that of Experimental Examples 6 to 12, and the thickness in each of Experimental Examples 17 to 23 is as shown in Table 1. Next, an Ag epoxy electrode layer is formed on the exposed external electrode in a manner the same as that of Experimental Example 1.

Test 1—Reliability of Moisture Resistance Test

In each case of Comparative Example 1 and Experimental Examples 2 to 23, insulation resistance (R*C) is measured for 200 samples after 1,000 hours are elapsed under the condition of a temperature of 85° C., a humidity of 85% RH, and an applied voltage of 15V/µm, and a case of 10[Ω·F] or less is defined as defective. The result is as shown in Table 1.

Test 2—Accelerated Moisture Load Test (Pressure Cooker Bias Test: PCBT)

In each case of Comparative Example 1 and Experimental Examples 2 to 23, insulation resistance (R*C) is measured for 200 samples after 1,000 hours is elapsed under the condition of a temperature of 121° C., a humidity of 100% RH, an atmospheric pressure of 2 atm, and an applied voltage of 20V/µm, and a case of 10[Ω·F] or less is defined as defective. The result is as shown in Table 1.

Test 3—Bending Strength Test

In each case of Comparative Example 1 and Experimental Examples 2 to 23, decrease in the capacity according to occurrence of bending crack has been confirmed by mounting 200 samples on an evaluation substrate and applying stress to the substrate. It is defined as ◎ when a normal capacity is implemented even when the bending is 10 mm, ○ when a normal capacity is implemented even when the bending is 7 mm, and Δ when a normal capacity is not implemented even when the bending is 7 mm, and the result is as shown in Table 1.

Test 4—Capacitance Test

In each case of Comparative Example 1 and Experimental Examples 2 to 23, capacitance is measured for 1,000 samples under the condition of 1 KHz and 0.5V, and based on the level of achieving a target capacitance (within 98% of the target capacitance), Good (1000/1000) is defined as ◎, Average is defined as (998/1000) ○, and Poor (less than 997/1000) is defined as Δ, and the result is as shown in Table 1.

Test 5—Visual Inspection

In each case of Comparative Example 1 and Experimental Examples 2 to 23, foreign substances, stain spots, and ceramic surface discoloration levels are examined for 1000 samples through a visual inspection, and Good (0/1000) is defined as ◎, Average (10/1000) is defined as ○, Poor (11 or more/1000) Dog) is defined as Δ, and the result is as shown in Table 1.

TABLE 1

| Sample number | Epoxy Applied to external electrode | Silane (nm) | Parylene(Å), (f; halogen-free) | Reliability of moisture resistance | Reliability of PCBT | Capacitance | Appearance | Bending strength |
|---|---|---|---|---|---|---|---|---|
| 16(Comparative example 1) | X | X | X | 5/200 | 3/200 | ◎ | ◎ | Δ |
| 4(Experimental example 1) | ○ | X | X | 5/200 | 3/200 | ◎ | ◎ | ○ |
| 17(Experimental example 2) | X | X | 10(f) | 2/200 | 1/200 | ◎ | ◎ | Δ |
| 23(Experimental example 3) | X | X | 30 | 3/200 | 1/200 | ◎ | ◎ | Δ |
| 18(Experimental example 4) | X | 10 | X | 5/200 | 2/200 | ◎ | ◎ | Δ |
| 24(Experimental example 5) | X | 100 | X | 5/200 | 1/200 | ◎ | ◎ | Δ |
| 19(Experimental example 6) | X | 10 | 100 | 0/200 | 0/200 | ◎ | ◎ | ○ |
| 21(Experimental example 7) | X | 100 | 100 | 0/200 | 0/200 | ◎ | ◎ | ○ |
| 14(Experimental example 8) | X | 300 | 100(f) | 0/200 | 0/200 | ◎ | ◎ | ○ |
| 13(Experimental example 9) | X | 30 | 10(f) | 0/200 | 0/200 | ◎ | ◎ | ○ |
| 22(Experimental example 10) | X | 100 | 500 | 0/200 | 0/200 | ○ | Δ | ○ |

TABLE 1-continued

| Sample number | Epoxy Applied to external electrode | Silane (nm) | Parylene(Å), (f; halogen-free) | Reliability of moisture resistance | Reliability of PCBT | Capacitance | Appearance | Bending strength |
|---|---|---|---|---|---|---|---|---|
| 20(Experimental example 11) | X | 500 | 30 | 0/200 | 0/200 | ○ | Δ | ○ |
| 15(Experimental example 12) | X | 1000 | 300(f) | 0/200 | 0/200 | Δ | Δ | Δ |
| 5(Experimental example 13) | ○ | X | 10(f) | 2/200 | 1/200 | ◎ | ◎ | ○ |
| 11(Experimental example 14) | ○ | X | 30 | 3/200 | 1/200 | ◎ | ◎ | ○ |
| 6(Experimental example 15) | ○ | 10 | X | 5/200 | 2/200 | ◎ | ◎ | ○ |
| 12(Experimental example 16) | ○ | 100 | X | 5/200 | 1/200 | ◎ | ◎ | ○ |
| 7(Experimental example 17) | ○ | 10 | 100 | 0/200 | 0/200 | ◎ | ◎ | ◎ |
| 1(Experimental example 18) | ○ | 30 | 10(f) | 0/200 | 0/200 | ◎ | ◎ | ◎ |
| 9(Experimental example 19) | ○ | 100 | 100 | 0/200 | 0/200 | ◎ | ◎ | ◎ |
| 10(Experimental example 20) | ○ | 100 | 500 | 0/200 | 0/200 | ○ | Δ | ◎ |
| 2(Experimental example 21) | ○ | 300 | 100(f) | 0/200 | 0/200 | ◎ | ◎ | ◎ |
| 8(Experimental example 22) | ○ | 500 | 30 | 0/200 | 0/200 | ○ | Δ | ◎ |
| 3(Experimental example 23) | ○ | 1000 | 300(f) | 0/200 | 0/200 | Δ | Δ | ◎ |

Results

About the Silane Coating Layer:

Referring to [Table 1], when only the silane coating layer is formed, i.e., in the case of Experimental Examples 4 and 5, and Experimental Examples 15 and 16 (including formation of an Ag epoxy electrode layer), the number of defects is decreased as a result of an accelerated moisture resistance load test in comparison with that of Comparative Example 1. It can be seen that as the ceramic surface is strengthened, reliability of the accelerated moisture resistance load of the multilayer ceramic electronic component is improved, and it may be predicted that the lifespan will also be improved.

About the Polyxylene Polymer Film (Parylene Film):

When only the polyxylene polymer film (parylene film) is formed, i.e., in the case of Experimental Examples 2 and 3, and Experimental Examples 13 and 14 (including formation of an Ag epoxy electrode layer), the moisture resistance reliability and the number of defects of the accelerated moisture resistance load are decreased in comparison with those of Comparative Example 1, and it can be seen that reliability of the moisture resistance and reliability of the accelerated moisture resistance load are improved as the ceramic surface is strengthened.

About the Double Layer of the Silane Coating Layer and the Polyxylene Polymer Film (Parylene Film):

As shown in Experimental Examples 6 to 9 and Experimental Examples 17, 18, 19, and 21 (including formation of an Ag epoxy electrode layer), all the properties of moisture resistance reliability, PCBT reliability, capacitance, and appearance are improved in comparison with those of Comparative Example 1. That is, it is shown that the double coating of the silane coating layer and the polyxylene polymer film (parylene film) further strengthens the ceramic surface, and therefore, reliability and lifespan are also improved. However, in the case of Experimental Examples 10 to 12, 20, 22, and 23 exceeding an appropriate thickness range, it can be seen that there is a tendency of decreasing the capacitance and showing defects in the appearance.

About the Epoxy Electrode Layer:

By simply comparing Comparative Example 1 and Experimental Example 1, it can be seen that bending strength is improved in Experimental Example 1 in which an Ag epoxy electrode layer is formed. In addition, by comparing the bending strength of Experimental Examples 2 to 12 and Experimental Examples 13 to 23, it can be seen that there is an effect of improving durability against bending cracks generated by formation of the Ag epoxy electrode layer.

Accordingly, the multilayer ceramic electronic component and its manufacturing method according to an embodiment of the present invention has an advantage of improving lifespan by minimized the effect of humidity as moisture resistance is improved by strengthening the surface of the ceramic body through uniform coating of the silane coating layer. In addition, as the ceramic surface is strengthened through a coating including a silane coating layer and a polyxylene polymer film, there is an effect of improving mechanical strength of components and fracture characteristics by thermal shock, and there is an advantage of applying the multilayer ceramic electronic component to a high voltage through minimization of surface discharge and electric field concentration. Furthermore, there is an effect of improving bending strength characteristics as durability against bending cracks is improved by providing a metal epoxy electrode layer in the external electrode.

The multilayer ceramic electronic component and its manufacturing method according to an embodiment of the present invention has an advantage of improving lifespan and reliability by minimized the effect of humidity as moisture resistance is improved by strengthening the surface of the ceramic body through uniform coating of the silane coating layer.

In addition, as the ceramic surface is strengthened through a coating including a silane coating layer and a polyxylene polymer film, there is an effect of improving mechanical strength of components and fracture characteristics by thermal shock, and there is an advantage of applying the multilayer ceramic electronic component to a high voltage through minimization of surface discharge and electric field concentration. Furthermore, there is an effect of improving bending strength characteristics as durability against bending cracks is improved by providing a metal epoxy electrode layer in the external electrode.

Although it has been described above with reference to preferred embodiments of the present invention, those skilled in the art will understand that it is possible to diversely modify and change the present invention within a range without departing from the spirit and scope of the present invention described in the following claims.

What is claimed is:

1. A multilayer ceramic electronic component comprising:
   an element unit including a ceramic body, and a plurality of first internal electrodes and second internal electrodes alternately positioned inside the ceramic body to be spaced apart from each other;
   an external electrode unit including a first external electrode electrically communicating with the first internal electrodes and a second external electrode electrically communicating with the second internal electrodes, which are positioned to surround both sides of the element unit and to be spaced apart from each other;
   a silane coating layer uniformly formed on an outer surface of the element unit to expose part of an outer surface of the external electrode unit;
   a polyxylene polymer film formed on the silane coating layer; and
   a plating layer formed on the exposed area of the external electrode unit.

2. The component according to claim 1, wherein the silane coating layer has a thickness of 10 to 300 nm.

3. The component according to claim 1, wherein the silane coating layer contains silane having a molecular weight within a range of 200 to 1000.

4. The component according to claim 1, wherein the silane coating layer is formed of a solution added with 40 to 70 vol % of a silane mixture, 10 to 50 vol % of isopropanol group, and 10 to 20 vol % of acetyl alcohol.

5. The component according to claim 4, wherein the silane mixture is formed to contain 30 to 60 vol % of aminopropyltriethoxysilane and 40 to 70 vol % of glycidoxypropyltriethoxysilane.

6. The component according to claim 1, wherein the polyxylene polymer film has a thickness of 10 to 100 Å.

7. The component according to claim 1, wherein a metal epoxy electrode layer is interposed between the exposed area of the external electrode unit and the plating layer.

8. A method of manufacturing a multilayer ceramic electronic component comprising the steps of:
   forming an element unit to include a ceramic body, and a plurality of first internal electrodes and second internal electrodes alternately positioned inside the ceramic body to be spaced apart from each other;
   manufacturing a chip by forming an external electrode unit including a first external electrode electrically communicating with the first internal electrodes and a second external electrode electrically communicating with the second internal electrodes, which are positioned to surround both sides of the element unit and to be spaced apart from each other;
   forming a silane coating layer, after uniformly coating the chip using a solution containing a silane mixture, to expose part of an outer surface of the external electrode unit;
   forming a polyxylene polymer film on the silane coating layer to expose part of the outer surface of the external electrode unit; and
   forming a plating layer on the exposed area of the external electrode unit.

9. The method according to claim 8, wherein the step of forming the silane coating layer includes a step of immersing the chip in a solution containing the silane mixture in a vacuum atmosphere of 0.1 to 1 Torr for 10 to 60 minutes, and curing for 10 to 50 minutes at a temperature of 100 to 200° C.

10. The method according to claim 8, wherein the step of forming the silane coating layer includes a step of exposing part of the outer surface of the external electrode unit by removing part of the silane coating layer using vibration barrel polishing.

11. The method according to claim 8, wherein the step of forming the silane coating layer includes a step of forming the silane coating layer to have a thickness of 10 to 300 nm.

12. The method according to claim 8, wherein the step of forming the silane coating layer includes a step of forming the silane coating layer to include silane having a molecular weight within a range of 200 to 1000.

13. The method according to claim 8, wherein the solution containing the silane mixture is manufactured by adding 40 to 70 vol % of a silane mixture, 10 to 50 vol % of isopropanol group, and 10 to 20 vol % of acetyl alcohol.

14. The method according to claim 13, wherein the silane mixture contains 30 to 60 vol % of aminopropyltriethoxysilane and 40 to 70 vol % of glycidoxypropyltriethoxysilane.

15. The method according to claim 8, wherein before the plating layer is formed, the polyxylene polymer film is formed to have a thickness of 10 to 100 Å.

16. The method according to claim 8, wherein before the plating layer is formed, a metal epoxy electrode layer is formed between the exposed area of the external electrode unit and the plating layer.

* * * * *